US011109570B2

(12) United States Patent
Beck

(10) Patent No.: US 11,109,570 B2
(45) Date of Patent: Sep. 7, 2021

(54) PET LEASH

(71) Applicant: Heather M. Beck, Draper, UT (US)

(72) Inventor: Heather M. Beck, Draper, UT (US)

( * ) Notice: Subject to any disclaimer, the term of this patent is extended or adjusted under 35 U.S.C. 154(b) by 0 days.

(21) Appl. No.: 16/824,797

(22) Filed: Mar. 20, 2020

(65) Prior Publication Data

US 2020/0214260 A1 Jul. 9, 2020

Related U.S. Application Data

(63) Continuation-in-part of application No. 14/551,910, filed on Nov. 24, 2014.

(60) Provisional application No. 61/943,527, filed on Feb. 24, 2014.

(51) Int. Cl.
*A01K 27/00* (2006.01)
*A01K 25/00* (2006.01)

(52) U.S. Cl.
CPC ............ *A01K 27/003* (2013.01); *A01K 25/00* (2013.01); *A01K 27/001* (2013.01)

(58) Field of Classification Search
CPC ..... A01K 27/001; A01K 27/003; A01K 25/00
USPC ......................................... 119/795, 793, 792
See application file for complete search history.

(56) References Cited

U.S. PATENT DOCUMENTS

| 2,821,168 | A | * | 1/1958 | Charles | ................ | A01K 27/003 |
| | | | | | | 119/795 |
| 2,861,547 | A | | 11/1958 | Dale | | |
| 2,994,300 | A | * | 8/1961 | Grahling | ............... | A01K 27/005 |
| | | | | | | 119/770 |
| 3,104,650 | A | * | 9/1963 | Grahling | ............... | A01K 27/005 |
| | | | | | | 119/770 |
| 3,884,190 | A | * | 5/1975 | Gurrey | ................. | A01K 27/004 |
| | | | | | | 119/797 |
| 4,763,609 | A | | 8/1988 | Kulik | | |
| 4,982,522 | A | | 1/1991 | Norton | | |
| 5,497,733 | A | * | 3/1996 | Hull | ..................... | A01K 27/001 |
| | | | | | | 119/793 |
| 5,551,379 | A | | 9/1996 | Hart | | |
| 5,699,555 | A | | 12/1997 | Schunter | | |
| 5,706,764 | A | * | 1/1998 | Irbinskas | ............. | A01K 27/005 |
| | | | | | | 119/792 |
| 5,709,172 | A | * | 1/1998 | Maglich | ............... | A01K 27/003 |
| | | | | | | 119/795 |
| 5,732,660 | A | | 3/1998 | David et al. | | |

(Continued)

FOREIGN PATENT DOCUMENTS

CA 2473391 A1 * 7/2003 .......... A01K 27/003
FR 2641939 B1 4/1991

(Continued)

*Primary Examiner* — Ebony E Evans
(74) *Attorney, Agent, or Firm* — Boudwin Intellectual Property; Daniel Boudwin

(57) ABSTRACT

A pet leash. The pet leash includes an elongated strap defining a first end disposed oppositely a second end. The first end defines a fixed loop. The fixed loop is designed to be held by a user. A ring is defined on the second end of the elongated strap. The ring is slidably mounted around the elongated strap, between the first end and the second end thereof. This defines an adjustable loop. An attachment strap with an attachment end and an opposing leash end, is slidably disposed upon the adjustable loop defined by the elongated strap. The attachment strap includes a fastener disposed on the attachment end thereof.

7 Claims, 3 Drawing Sheets

(56) References Cited

U.S. PATENT DOCUMENTS

| | | | | |
|---|---|---|---|---|
| 5,860,198 | A * | 1/1999 | Buntin, Jr. | A01K 27/005 24/600.5 |
| 6,089,636 | A * | 7/2000 | Harris | A01K 1/0236 294/150 |
| 6,401,666 | B1 | 6/2002 | Kircher | |
| 6,595,156 | B1 * | 7/2003 | Curran | A01K 25/00 119/792 |
| 7,066,113 | B2 * | 6/2006 | Cheng | A01K 27/001 119/863 |
| 7,640,895 | B2 | 1/2010 | Fountoulakis et al. | |
| 8,281,748 | B2 * | 10/2012 | Elkins | A01K 13/001 119/792 |
| 8,327,808 | B2 * | 12/2012 | Chirico | A01K 27/00 119/792 |
| D695,469 | S * | 12/2013 | Dougherty | D30/153 |
| 9,271,476 | B1 | 3/2016 | Flynn | |
| 9,392,769 | B2 * | 7/2016 | Van Bemmelen | A01K 27/003 |
| 9,441,665 | B2 * | 9/2016 | Liang | F16B 45/02 |
| 9,470,258 | B2 * | 10/2016 | Fitz-Earle | F16B 45/02 |
| 2008/0134989 | A1 | 6/2008 | Weiss | |
| 2010/0083912 | A1 * | 4/2010 | Hurwitz | A01K 27/006 119/792 |
| 2010/0294212 | A1 | 11/2010 | Therrian | |
| 2012/0060768 | A1 | 3/2012 | Sandler | |
| 2013/0074782 | A1 | 3/2013 | Marran | |
| 2017/0127653 | A1 * | 5/2017 | Fang | A01K 27/005 |
| 2019/0017535 | A1 * | 1/2019 | Ormsbee | F16B 45/02 |
| 2019/0166983 | A1 * | 6/2019 | Moreland | A45F 5/021 |

FOREIGN PATENT DOCUMENTS

| | | | | |
|---|---|---|---|---|
| GB | 2460083 | A * | 11/2009 | A01K 25/00 |
| GB | 2489200 | A * | 9/2012 | A01K 27/00 |

* cited by examiner

PET LEASH

CROSS REFERENCE TO RELATED APPLICATIONS

This application claims the benefit of U.S. Non-Provisional patent application Ser. No. 14/551,910 filed on Nov. 24, 2014, which claims the benefit of U.S. Provisional Application No. 61/943,527 filed on Feb. 24, 2014. The above identified patent application is herein incorporated by reference in its entirety to provide continuity of disclosure.

BACKGROUND OF THE INVENTION

The present invention relates to a pet leash. More specifically, the present invention provides a pet leash that is used to train a dog how to walk on a leash without pulling or otherwise demonstrating aggressive behavior. The leash can be used as a conventional leash, or can be disposed about the dog's head and muzzle so as to aid in teaching a dog not to pull on the leash while out on a walk.

Many pets, particularly dogs, must regularly be taken on walks in order to maintain the pet's health and to allow the pet to exercise. This is particularly true where the pet owner lives in an urban environment wherein the dog cannot spend time outdoors while unattended. Dogs may become depressed or overweight if they are not frequently walked, and may also become destructive within a home.

However, many pet owners have difficulty walking a strong or aggressive dog. Young children, the elderly, and people having physical handicaps may find it difficult to properly control and restrain a dog while out for a walk in a public place. As a result, the dog may take control, dragging the pet owner along with the dog, potentially resulting in injury to the pet owner. Further, if the dog is not properly controlled while on a walk, the dog may damage the property of others and may even cause physical harm to another animal or person. If a dog owner experiences difficulty walking their dog, the pet owner may stop walking their dog, but failing to walk a dog may adversely affect the dog's health and well-being.

The present invention provides a pet leash that assists users in training a dog to walk on a leash without pulling or becoming aggressive. The pet leash comprises an elongated strap having a fixed loop at a first end thereof adapted to be held by a user. A second end of the pet leash includes a ring thereon through which a portion of the elongated strap is threaded, so as to form an adjustable loop at the second end of the leash. An attachment strap extends from the adjustable loop and includes a fastener on an end thereof that can be secured to a dog's collar. The pet leash can be used in a conventional fashion by disposing the adjustable loop around an upper portion of a dog's neck and by securing the fastener on the attachment strap to the dog's collar. Alternatively, to teach the dog to not pull on the leash, the adjustable loop can be disposed about a dog's head such that a portion of the loop is wrapped around the dog's muzzle. The positioning of the adjustable loop around the dog's head helps to control the dog while the pet owner is taking the dog for a walk.

Devices have been disclosed in the prior art that relate to pet leashes. These include devices that have been patented and published in patent application publications. These devices generally relate to pet leashes of various construction. The following is a list of devices deemed most relevant to the present disclosure, which are herein described for the purposes of highlighting and differentiating the unique aspects of the present invention, and further highlighting the drawbacks existing in the prior art.

Some devices in the prior art relate to pet leashes having rings or other fasteners thereon that can be secured to a dog's collar. One such device, U.S. Pat. No. 4,763,609 to Kulik discloses an animal leash having a middle section with rings at each end, and first and second end sections. Each end section has one end thereof connected to a ring, and another end portion having a connector thereon. Similarly, U.S. Pat. No. 7,640,895 to Fountoulakis et al. discloses a pet leash comprising a strap with a carabiner at a first end and a holding loop at a second end. The leash is adapted to permit a strong animal to be controlled by the pet owner. A hand grip is disposed on the holding loop or adjacent thereto. These devices, however, fail to disclose a pet leash having a fixed loop at a first end, and an adjustable loop at a second end that can be disposed about a dog's head and muzzle, and further having an attachment strap extending from the adjustable loop.

Other patents relate to pet harnesses to be worn by dogs and other pets. U.S. Patent Application Publication Number 2012/0060768 to Sandler discloses a collar and leash system wherein a single strap includes connecting means along the strap. The connecting means are positioned so that the device can be assembled to form a collar or a harness. Similarly, U.S. Pat. No. 6,401,666 to Kircher discloses an animal harness to be worn around the body of a dog or other animal. A leash is secured thereto, and when pulled, the harness tightens around the animal's abdomen, causing the animal to become submissive. Thus, Sandler and Kircher describe harnesses to be worn around a dog's body, and fail to disclose pet leashes that include an adjustable loop on the end of an elongated strap adapted to be disposed around a dog's head or neck.

U.S. Pat. No. 6,595,156 to Curran discloses a halter for controlling an animal. The halter comprises an anchor portion secured on the dog's head having anchor points on opposing sides of the animal's neck. A nape portion extends across the back of the animal's neck. The anchor portion is placed over the dog's snout. Thus, when a leash connected to the nape portion is pulled, the nape portion tightens, causing the dog to become submissive. Thus, while Curran discloses a device having straps disposed on an animal's head, the device is not adapted to be selectively used as a conventional leash or as a leash for controlling or restraining an aggressive dog.

Finally, U.S. Pat. No. 2,861,547 to Dale discloses an animal leash that can be adjusted in length. The leash can be adjusted to different lengths without disconnecting the leash from the animal. Thus, Dale does not disclose a pet leash adapted to teach a pet to walk on a leash without pulling or becoming aggressive, and does not disclose a pet leash having an adjustable loop adapted to be secured about a dog's head or neck.

These prior art devices have several known drawbacks. The devices in the prior art generally relate to pet leashes and harnesses of various construction. However, conventional pet leashes are not adapted to teach a dog how to walk on a leash without pulling or otherwise being aggressive, and do not include straps disposed over the dog's head. Thus, the animal can pull the user along and the user is unable to restrain the dog using the leash. Animal harnesses are disclosed for controlling aggressive animals and to cause animals to become submissive, however, harnesses must be worn around the dog's body, and may be difficult and inconvenient to position on the dog. Further, the harnesses must be adjusted so as to fit closely to the dog's body. Thus, a pet leash that can be used to walk a dog in a conventional manner or that can be used to teach a dog to walk on a leash is desired.

In light of the devices disclosed in the prior art, it is submitted that the present invention substantially diverges in design elements from the prior art and consequently it is clear that there is a need in the art for an improvement to existing pet leash devices. In this regard the instant invention substantially fulfills these needs.

SUMMARY OF THE INVENTION

In view of the foregoing disadvantages inherent in the known types of pet leashes now present in the prior art, the present invention provides a new pet leash wherein the same can be utilized for providing convenience for the user when teaching a pet to walk on a leash without pulling or being aggressive.

It is therefore an object of the present invention to provide a new and improved pet leash device that has all of the advantages of the prior art and none of the disadvantages.

It is another object of the present invention to provide a pet leash that can be used as a conventional leash or that can be used to help teach a dog not to pull on the leash while being walked.

Another object of the present invention is to provide a pet leash that can be disposed on an upper portion of a dog's neck in order to walk the dog in the traditional manner.

Yet another object of the present invention is to provide a pet leash having an adjustable loop at an end thereof that can be disposed about a dog's head and muzzle so as to help restrain the dog when the dog pulls too strongly.

Another object of the present invention is to provide a pet leash that may be readily fabricated from materials that permit relative economy and are commensurate with durability.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
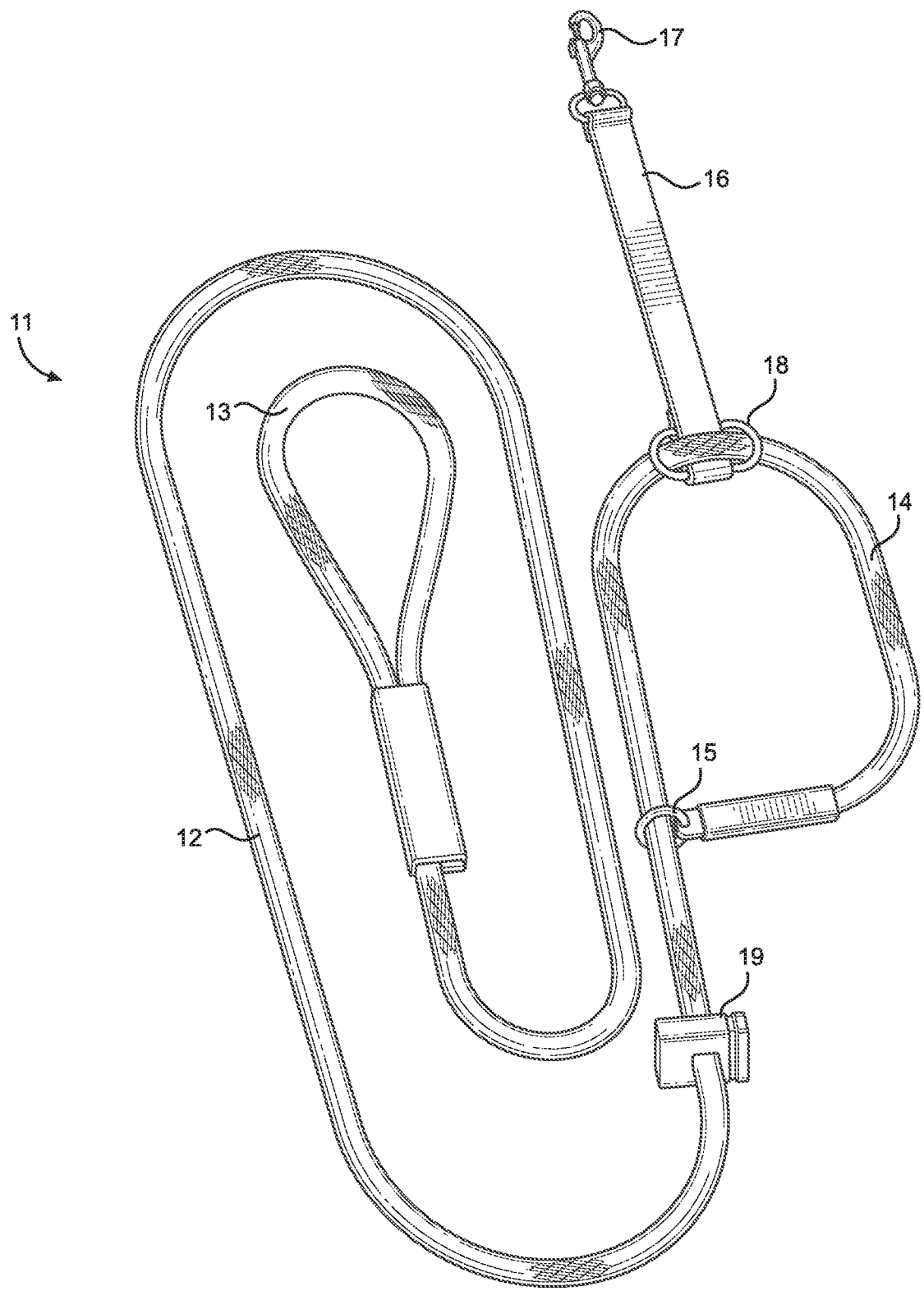
FIG. 1 shows a perspective view of the pet leash of the present invention.

Reference is made herein to the attached drawings. Like reference numerals are used throughout the drawings to depict like or similar elements of the pet leash. For the purposes of presenting a brief and clear description of the present invention, the preferred embodiment will be discussed as used for controlling or restraining a dog while walking the dog. The figures are intended for representative purposes only and should not be considered to be limiting in any respect.

Referring now to FIG. 1, there is shown a perspective view of the pet leash of the present invention. The pet leash 11 of the present invention includes an elongated strap 12 having a first end 13 and a second end. The elongated strap 12 is preferably composed of a durable fabric material such as nylon or leather, a composite material, or other materials conventionally used to manufacture pet leashes.

The first end 13 of the leash 11 includes a fixed loop thereon. The fixed loop is formed by securing the terminal end of the elongated strap 12 to a portion along the length of the elongated strap 12. The terminal end can be secured by stitching, adhesives, or other suitable fasteners. The fixed loop is adapted to receive a user's hand therethrough, so that the user can easily hold the pet leash 11. The fixed loop may additionally include padding or cushioning thereon to provide the user with a comfortable grip.

The second end 14 of the elongated strap 12 includes a ring 15 on the terminal end thereof. The first end 13 of the elongated strap 12 is inserted through the ring 15 so that an adjustable loop is formed at the second end 14 of the elongated strap. The ring 15 is adapted to slide along the elongated strap 12 so that the adjustable loop can be adjusted in size. Further, a safety lock 19 is slidably positioned on the elongated strap 12 and can be moved along the length thereof. The safety lock 19 can be moved towards the second end 14 of the elongated strap to constrain the movement of the ring 15 along the elongated strap 12, limiting the size of the adjustable loop.

An attachment strap 16 is secured to a portion of the elongated strap 12 near the second end 14 thereof. In some embodiments, the attachment strap 16 is attached to the elongated strap 12 via an S-lock 18 thereon. As shown, the S-lock 18 comprises a pair of opposing openings configured to allow the elongated strap 12 to form a loop between the opposing openings. A first end of the attachment strap 16 is permanently secured to the S-lock 18 and a second end of the attachment strap 16 includes a fastener 17 thereon. Preferably, the fastener 17 comprises a carabiner, or other similar fastening device commonly used in pet leashes that can be easily opened and closed by a user. In the illustrated embodiment, the fastener 17 is a swivel snap. The fastener 17 is adapted to be secured to a pet's collar so as to connect the pet leash 11 thereto.

Figure 2:
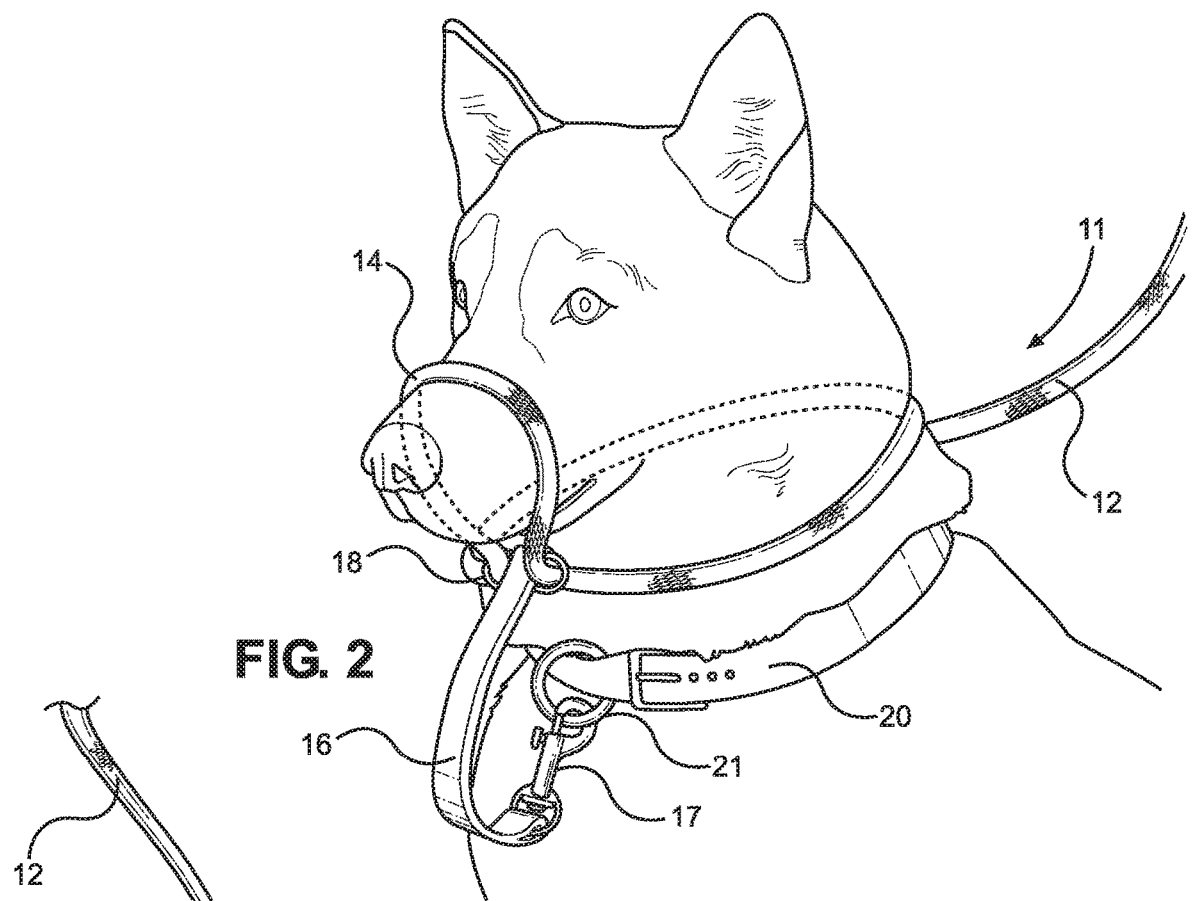
FIG. 2 shows a view of the pet leash of the present invention as used to teach a dog not to pull on a leash.

Referring now to FIG. 2, there is shown a view of the pet leash of the present invention as used to train a dog to walk on the leash of the present invention. In the illustrated embodiment, the leash 11 is positioned on a dog so as to help the user to train the dog to walk on the leash without pulling or becoming aggressive. In operation, the adjustable loop on the second end 14 of the elongated strap 12 is pulled through the S-lock 18. A first portion, defined as the portion of the elongated strap 12 extending through the S-lock 18, of the adjustable loop is then positioned around the dog's muzzle. The second portion of the adjustable loop, defined on an opposing side of the S-lock 18 from the first portion, extends around the back of the dog's head. In this way, the adjustable loop is securely and comfortably positioned on the dog. The adjustable loop is situated on the dog's head and around the back of the head so that the strap is not positioned around the dog's neck.

With the adjustable loop positioned on the dog's head and muzzle, the adjustable loop will tighten on the dog's head if the dog pulls too strongly on the elongated strap 12. The tightening of the adjustable loop will cause the dog to become submissive and will discourage the dog from pulling too strongly. The positioning of the adjustable loop on the dog's snout and head prevents the pet leash from choking or otherwise harming the dog.

Although the pet leash is secured to the dog by disposing the adjustable loop about the dog's head and muzzle, the fastener 17 on the attachment strap 16 can be secured to a ring 21 on the dog's collar 20 in order to further secure the pet leash 11 to the dog. In this way, the dog is preventing from breaking free of the leash if the dog was able to maneuver the adjustable loop off of its head and muzzle.

Figure 3:
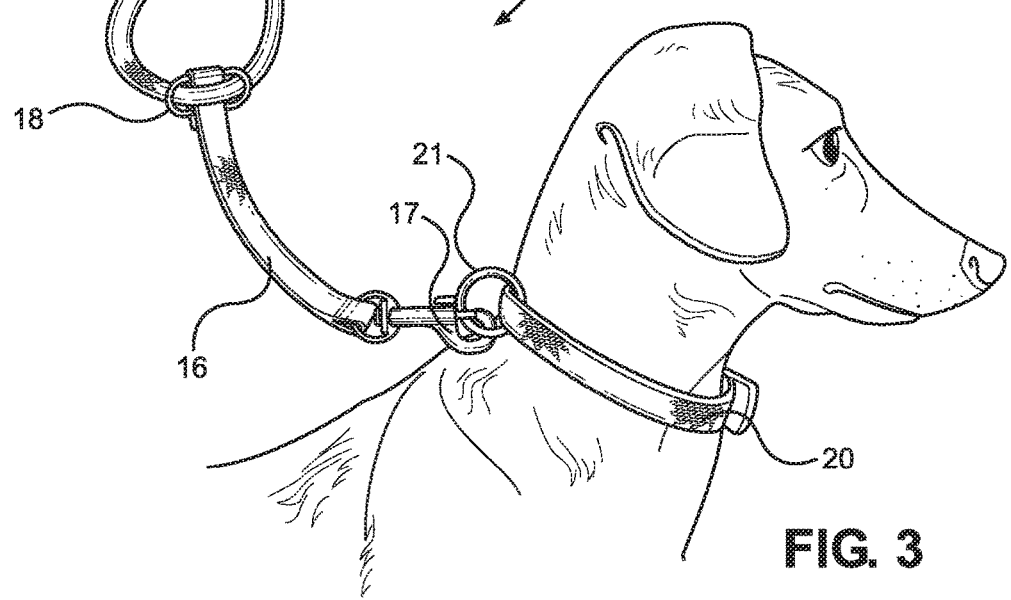
FIG. 3 shows a view of the attachment strap of the pet leash of the present invention secured to a dog's collar.

Referring now to FIG. 3, there is shown a view of the attachment strap of the pet leash of the present invention secured to a dog's collar. The pet leash 11 of the present invention can be secured to a dog in various ways depending on whether the user wishes to train the dog to not pull on the leash, or if the user wants to walk the dog in the conventional manner. In either case, the user may secure the attachment strap 16 to a dog's collar 20 in order to ensure that the dog does not break free from the pet leash 11. Thus, the fastener 17 on the attachment strap 16 can be secured to a ring 21 on the dog's collar 20. Even if the dog can slip its head out of the adjustable loop on the elongated strap 12 adjacent the second end thereof, the dog is still connected to the pet leash via the attachment strap 16. In the illustrated embodiment, the pet leash 11 is shown in a first position, defined such that the elongated strap 12 is usable as a conventional leash.

Figure 4:
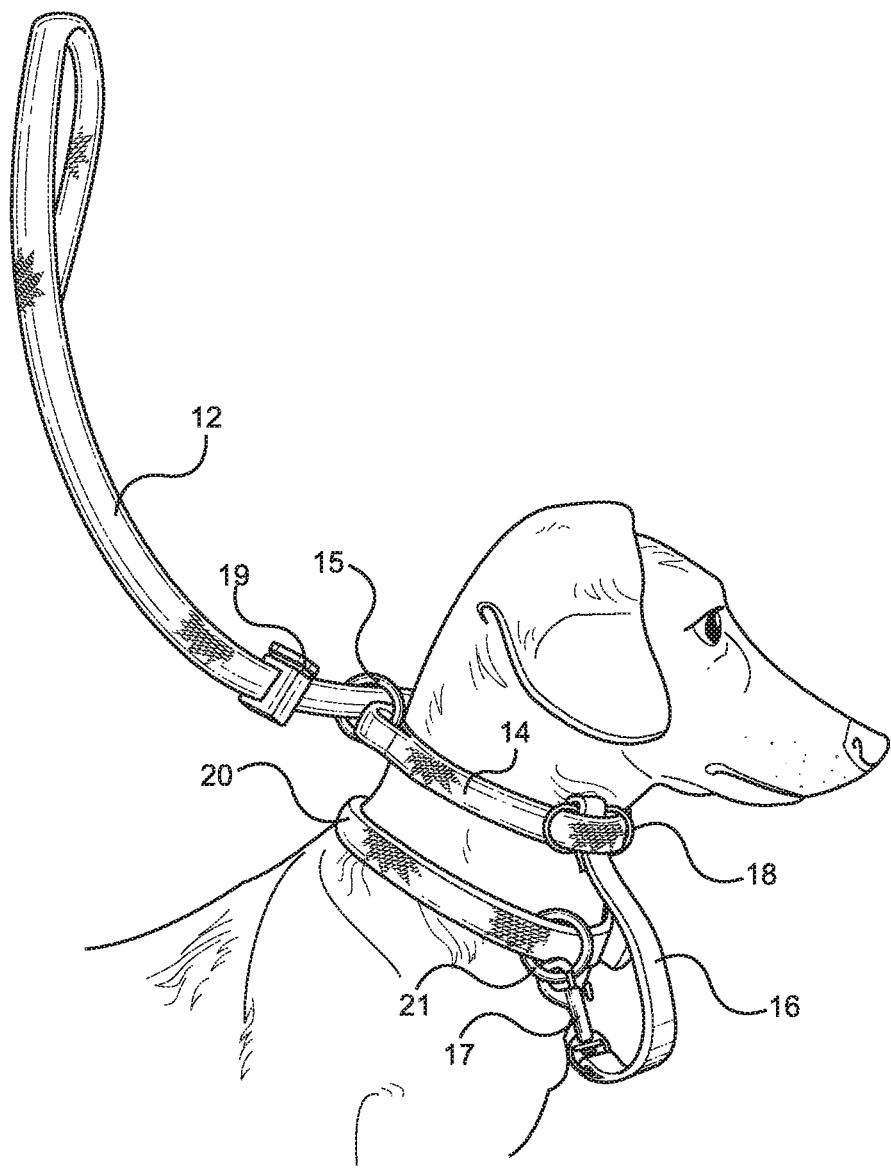
FIG. 4 shows a view of the pet leash of the present invention as used as a conventional leash.

Referring now to FIG. 4, there is shown a view of the pet leash of the present invention as used as a conventional leash. Once the dog has been trained no to pull on the leash, the user may use the pet leash 11 as a conventional leash in order to walk the dog. As shown, the adjustable loop on the second end 14 of the elongated strap 12 can be disposed on an upper portion of a dog's neck, defining a second position. The positioning of the adjustable loop prevents the dog from choking or otherwise being hurt by the adjustable loop. The ring 15 of the elongated strap is positioned on the rear of the dog's neck or head so that the elongated strap 12 of the pet leash 11 extends rearward therefrom so that the user may walk the dog. The safety lock 19 can be moved towards the ring 15 so as to secure the adjustable loop in position around the dog's neck.

The user may additionally secure the attachment strap 16 to the dog's collar 20 by securing the fastener 17 on the second end of the attachment strap 16 to a ring 21 on the dog's collar. This secures the dog to the pet leash 11 even if the dog is able to slip its head out of the adjustable loop of the elongated strap 12.

The present invention provides a pet leash for training a dog that can be used in various ways. The pet leash can be disposed over a dog's head and muzzle in order to train the dog to not pull or become aggressive while out for a walk on a leash. Once the dog has been trained to not pull on the leash while on a walk, the user may walk the dog by simply disposing the adjustable loop around the upper end of a dog's neck. Regardless of how the leash is used, an attachment strap near the second end of the elongated strap can be secured to a dog's collar by means of a fastener thereon. The attachment strap serves to prevent the dog from breaking free of the leash if the dog is able to slip its head from the adjustable loop. Thus, the present invention can be used in various ways and helps a user to restrain a dog that pulls while walking on a leash.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet leash, comprising:
an elongated strap defining a first end disposed oppositely a second end;
wherein the first end defines a fixed loop;
the fixed loop is configured to be held by a user;
a ring defined on the second end;
the ring slidably disposed around the elongated strap, between the first end and the second end thereof, such that an adjustable loop is defined;
an attachment strap having an attachment end disposed oppositely a leash end;
wherein the attachment strap is slidably disposed upon the adjustable loop defined by the elongated strap;
the attachment strap comprising a fastener disposed on the attachment end thereof;
wherein the attachment strap is attached to the elongated strap via an S-lock;
wherein the S-lock comprises a pair of opposing openings configured to allow the elongated strap to form a loop between a first opposing opening and a second opposing opening;
the attachment strap defined between the pair of opposing openings;
wherein the elongated strap is movable between a first position and a second position, wherein the first position is defined where the elongated strap is utilized as a conventional leash and the second position is defined where the adjustable loop on the second end of the elongated strap is disposed on an upper portion of the dog's neck, wherein the attachment strap attaches to a collar of the animal in the first position and the second position.

2. The pet leash of claim 1, wherein a safety lock is slidably positioned on the elongated strap between the fixed loop and the ring, such that the ring is constrained to the second end of the elongated strap, wherein the safety lock comprises a push button to enable sliding of the safety lock.

3. The pet leash of claim 1, wherein the fastener comprises a carabiner.

4. The pet leash of claim 1, wherein the fastener comprises a swivel snap.

5. The pet leash of claim 1, wherein the fixed loop at the first end of the elongated strap is formed by securing a terminal end of the elongated strap to a portion of the elongated strap.

6. The pet leash of claim 1, wherein the elongated strap is further movable into a third position, wherein a first portion of the adjustable loop, extending through the S-lock, is dimensioned to receive the muzzle of the animal and the second portion of the adjustable loop is dimensioned to receive the back of the dog's neck, wherein the attachment strap attaches to the collar of the animal in the third position.

7. The pet leash of claim 1, wherein the fixed loop comprises padding disposed thereon.

\* \* \* \* \*